United States Patent
Kao et al.

(10) Patent No.: US 10,754,079 B1
(45) Date of Patent: Aug. 25, 2020

(54) LIGHT GUIDE PLATE

(71) Applicant: Optivision Technology Inc., Hsinchu (TW)

(72) Inventors: Chia-Kuo Kao, Taichung (TW); Tsung-Hsien Wu, Hsinchu (TW); Li-Jen Hsu, Zhuangwei Township, Yilan County (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/398,530

(22) Filed: Apr. 30, 2019

(30) Foreign Application Priority Data

Feb. 25, 2019 (TW) .............................. 108106252 A

(51) Int. Cl.
  *F21V 7/04* (2006.01)
  *F21V 8/00* (2006.01)
(52) U.S. Cl.
  CPC ........... *G02B 6/002* (2013.01); *G02B 6/0055* (2013.01)
(58) Field of Classification Search
  None
  See application file for complete search history.

(56) References Cited

U.S. PATENT DOCUMENTS

2007/0058104 A1   3/2007   Chen et al.

FOREIGN PATENT DOCUMENTS

TW   201405211 A   2/2014

OTHER PUBLICATIONS

Search Report appended to an Office Action, which was issued to Taiwanese counterpart application No. 108106252 by the TIPO dated May 16, 2019, with an English translation thereof.
Search Report appended to an Office Action, which was issued to Taiwanese counterpart application No. 108106252 by the TIPO dated Mar. 10, 2020, with an English translation thereof (2 pages).

*Primary Examiner* — Vip Patel
(74) *Attorney, Agent, or Firm* — Hamre, Schumann, Mueller & Larson, P.C.

(57) ABSTRACT

A light guide plate includes a plate body having a light exit surface, a reflection surface opposite to the light exit surface, and a light-incident surface connected between the light exit surface and the reflection surface and adapted to face a light source. The light-incident surface includes a vertical portion perpendicularly connected to the light exit surface, and a sloped portion connecting the vertical portion and the reflection surface. The sloped portion is inwardly inclined from the vertical portion towards the reflection surface.

5 Claims, 3 Drawing Sheets

LIGHT GUIDE PLATE

CROSS-REFERENCE TO RELATED APPLICATION

This application claims priority of Taiwanese Invention Patent Application No. 108106252, filed on Feb. 25, 2019.

FIELD

This disclosure relates to a light guide plate, and more particularly to a light guide plate for side-emitting backlight modules.

BACKGROUND

A conventional liquid crystal display (LCD) requires a backlight module for displaying images, and such backlight module usually includes a light source and a light guide plate for guiding scattering of light emitted from the light source and exiting from the backlight module, so as to improve the luminance and ensuring the uniformity of the luminance of the LCD.

Referring to FIG. 1, a conventional side-emitting backlight module includes a light guide plate 91, a light source 92, and a reflector 93. The light guide plate 91 has a light exit surface 911, a reflection surface 912 opposite to the light exit surface 911, and a light-incident surface 913 that is connected between the light exit surface 911 and the reflection surface 912, and which separately faces the light source 92. Light emitted from the light source 92 will enter the light guide plate 91 through the light-incident surface 913 and mostly exit from the light guide plate 91 through the light exit surface 911. The reflection surface 912 and the light-incident surface 913 are respectively formed with diffusive microstructures (not shown) so as to more evenly distribute the light exiting from the light exit surface 911. The reflector 93 is disposed opposite to the reflection surface 912 and the light exiting from the reflection surface 912 will be reflected back into the light guide plate 91, thereby increasing utilization of the light by the conventional side-emitting backlight module. Additionally, the light source 92 has a light-exiting surface 921 for emission of the light generated by the light source 92 therefrom. The light-exiting surface 921 of the light source 92 corresponds in position and size to the light-incident surface 913 of light guide plate 91 so as to reduce light leakage and light energy loss.

Referring to FIG. 2, the light guide plate 91 of the conventional side-emitting backlight module has a visible area 911a in positional correspondence to a screen of the LCD (not shown). For fulfilling requirements of full screen and narrow bezel for the LCD, a distance (d) between the visible area 911a and the light-incident surface 913 gradually becomes narrower as technology advances. In addition, the diffusive microstructure formed on the light-incident surface 913 tends to be more compact and microminiaturized, and the diffusive microstructure formed on the reflection surface 912 tends to have a relatively high light directivity based on the needs of luminance. These developments of the light guide plate 91 may increase the need for a greater extent of even light distribution in areas near the light-incident surface 913. Existing designs of the light guide plate 91 may unfavorably result in grated speckles in the areas near the light-incident surface 913. When the light exit surface 911 is formed with a V-CUT or R-CUT microstructure, the light exiting therefrom may easily have the form of dipped beams.

SUMMARY

Therefore, an object of the disclosure is to provide a light guide plate so as to alleviate or eliminate the aforesaid shortcomings of the conventional light guide plate.

According to the disclosure, a light guide plate includes a plate body having a light exit surface, a reflection surface opposite to the light exit surface, and a light-incident surface that is connected between the light exit surface and the reflection surface and that is adapted to face a light source for receiving a light emitted from the light source.

The light-incident surface includes a vertical portion perpendicularly connected to the light exit surface, and a sloped portion connecting the vertical portion and the reflection surface. The sloped portion is inwardly inclined from the vertical portion towards the reflection surface. The plate body has a thickness (T1) in a direction (D) extending from the reflection surface to the light exit surface, and the vertical portion has a perpendicular distance (T2) extending between the sloped portion to the light exit surface in the direction (D). The perpendicular distance (T2) is smaller than the thickness (T1).

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
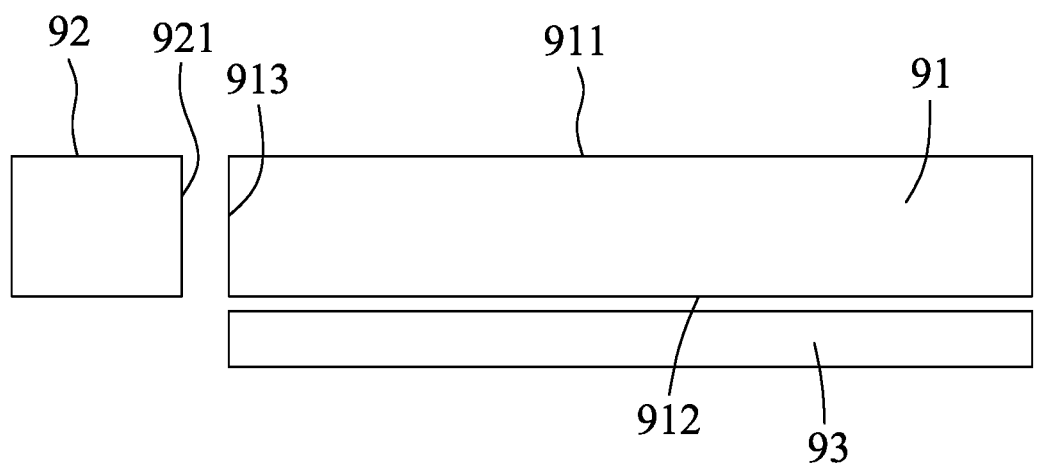
FIG. 1 is a schematic view illustrating a positional relationship between a light guide plate and a light source of a conventional backlight module.
Figure 2:
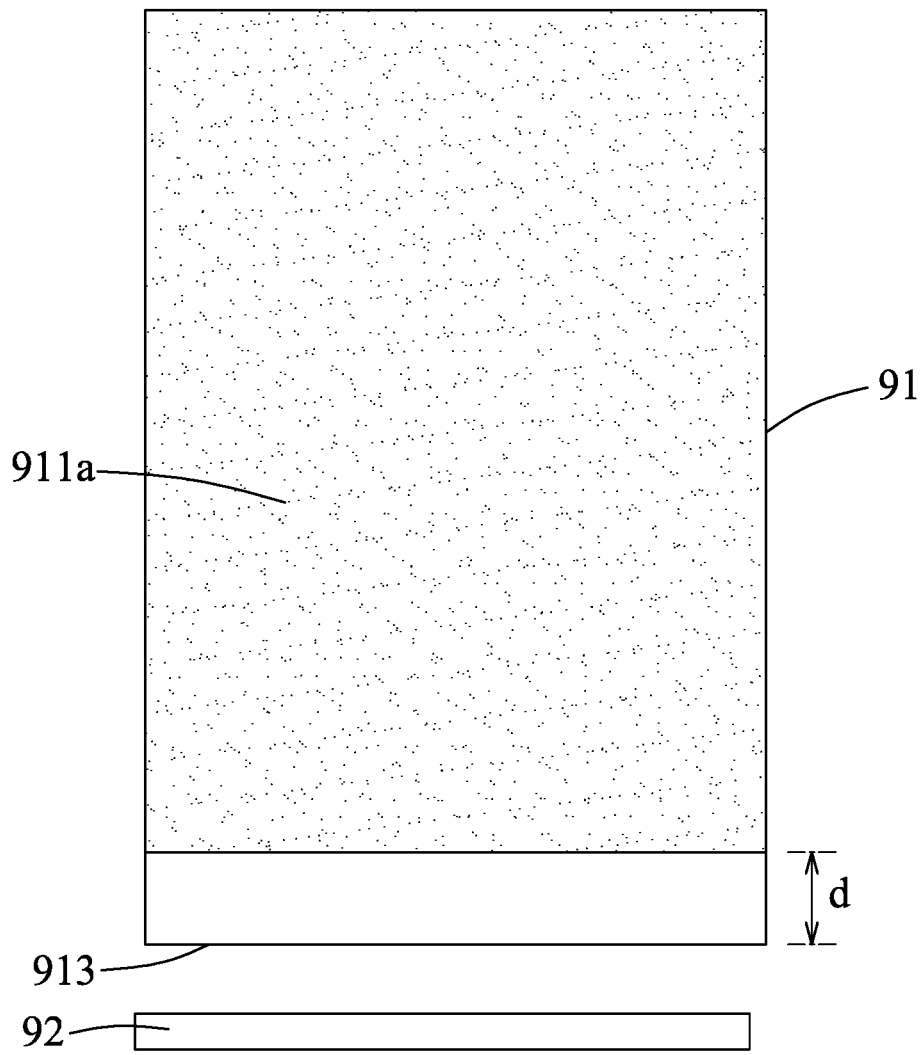
FIG. 2 is a schematic view illustrating a distance between a visible area and a light-incident surface of the light guide plate of FIG. 1.
Figure 3:
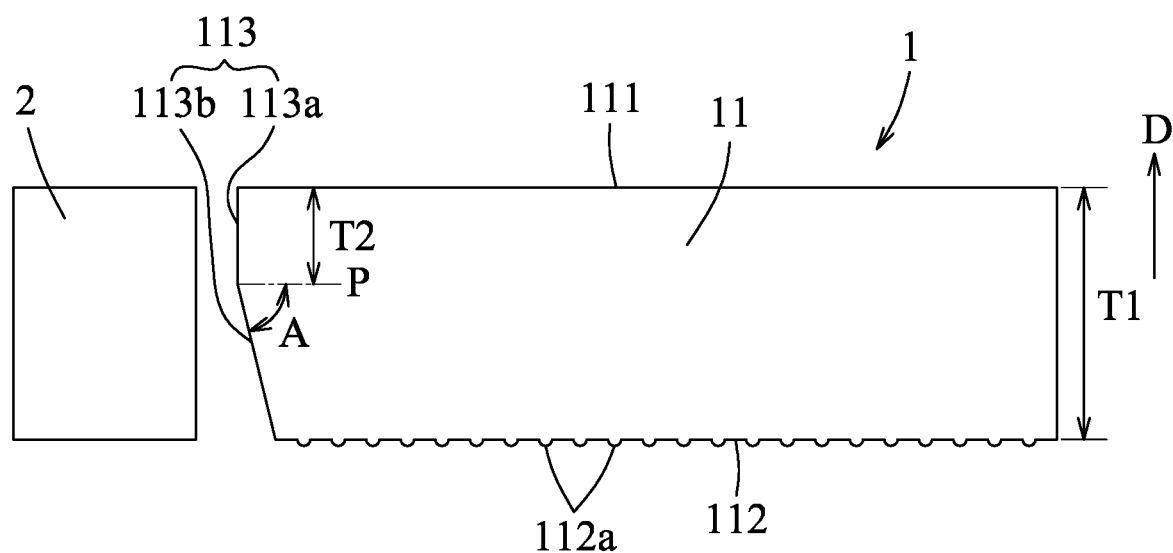
FIG. 3 is a schematic view illustrating a positional relationship between an embodiment of a light guide plate according to the disclosure and a light source.

Referring to FIG. 3, a light guide plate 1 of the disclosure includes a plate body 11 having a light exit surface 111, a reflection surface 112 opposite to the light exit surface 111, and a light-incident surface 113 connected between the light exit surface 111 and the reflection surface 112. The light-incident surface 113 is arranged to face a light source 2 for receiving a light emitted from the light source 2 so that the light guide plate 1 and the light source 2 cooperatively serve as a backlight module for a display device (not shown).

The light-incident surface 113 includes a vertical portion 113a perpendicularly connected to the light exit surface 111, and a sloped portion 113b connecting the vertical portion 113a and the reflection surface 112. The sloped portion 113b is inwardly inclined from the vertical portion 113a towards the reflection surface 112.

The plate body 11 has a thickness (T1) in a direction (D) extending from the reflection surface 112 to the light exit surface 111. The vertical portion 113a has a perpendicular distance (T2) extending between the sloped portion 113b and the light exit surface 111 in the direction (D). The perpendicular distance (T2) is smaller than the thickness (T1). In this embodiment, the T2 may be 0, i.e., the T1 and T2 satisfy a relation formula of $0 \leq T2 < T1$. When T2 is 0, the vertical portion 113a is absent from the light guide plate 1 and the sloped portion 113b is connected directly to the light exit surface 111. In one form, the thickness (T1) and the perpendicular distance (T2) satisfy a relation formula of T1/3≤T2≤2T1/3.

In this embodiment, the sloped portion 113b has an inclined angle relative to the light exit surface 111, which is equivalent to an included angle (A) between the sloped portion 113b and a phantom plane (P) paralleling with the light exit surface 111, and ranges from 3° to 85°. In one form, the inclined angle ranges from 5° to 50°.

The perpendicular distance (T2) of the vertical portion 113a of the light-incident surface 113 and the inclined angle of the sloped portion 113b can be adjusted based on the thickness (T1) of the plate body 11. In one form, a distance between a junction of the vertical and sloped portions 113a, 113b and a projection line of a junction of the sloped portion 113b and the reflection surface 112 on the phantom plane (P) is no less than 0.03 mm. By virtue of the light-incident surface 113 formed with the vertical portion 113a and the sloped portion 113b, occurrence of grated speckles in a portion of a visible area present in the light exit surface 111, which is near to the light-incident surface 113, is prevented.

In this embodiment, the light-incident surface 113 is a smooth surface. In other forms, the light-incident surface 113 may be a roughened surface, such as a diffusive microstructure-formed surface, based on usage requirements.

In this embodiment, the reflection surface 112 is formed with a directional microstructure having a plurality of dots 112a. The dots 112a may be formed by existing techniques well-known in the art, and may be specifically designed based on practical requirements.

In this embodiment, the light exit surface 111 is a smooth surface. In other forms, the light exit surface 111 may be formed with a V-CUT or R-CUT microstructure. With formation of the sloped portion 113b, dipped beams caused by the light exit surface 111 formed with the microstructures is diminished.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A light guide plate, comprising:
   a plate body having
      a light exit surface,
      a reflection surface opposite to said light exit surface, and
      a light-incident surface that is connected between said light exit surface and said reflection surface, said light-incident surface is adapted to face a light source for receiving a light emitted from the light source,
   wherein said light-incident surface includes a vertical portion perpendicularly connected to said light exit surface, and a sloped portion connecting said vertical portion and said reflection surface, said sloped portion inwardly inclined from said vertical portion towards said reflection surface; and
   wherein said plate body has a thickness (T1) in a direction extending from said reflection surface to said light exit surface, said vertical portion having a perpendicular distance (T2) extending between said sloped portion to said light exit surface in the direction, said perpendicular distance (T2) being smaller than said thickness (T1).

2. The light guide plate according to claim 1, wherein said sloped portion has an inclined angle relative to said light exit surface ranging from 3° to 85°.

3. The light guide plate according to claim 2, wherein said inclined angle ranges from 5° to 50°.

4. The light guide plate according to claim 1, wherein said thickness (T1) and said perpendicular distance (T2) satisfies a relation formula of T1/3≤T2≤2T1/3.

5. The light guide plate according to claim 1, wherein said reflection surface is formed with a directional microstructure having a plurality of dots.

\* \* \* \* \*